(12) United States Patent
Nakayama

(10) Patent No.: US 7,266,695 B2
(45) Date of Patent: Sep. 4, 2007

(54) DATA UPDATING METHOD AND DATA UPDATING SYSTEM

(75) Inventor: Keisuke Nakayama, Tokyo (JP)

(73) Assignee: Systemneeds, Inc., Tokyo (JP)

( * ) Notice: Subject to any disclaimer, the term of this patent is extended or adjusted under 35 U.S.C. 154(b) by 755 days.

(21) Appl. No.: 10/436,995

(22) Filed: May 14, 2003

(65) Prior Publication Data

US 2003/0217270 A1    Nov. 20, 2003

(30) Foreign Application Priority Data

May 20, 2002    (JP)    ............ P. 2002-144486

(51) Int. Cl.
*H04L 9/00*    (2006.01)
(52) U.S. Cl. .............. 713/172; 713/155; 726/9; 726/20
(58) Field of Classification Search ........... 713/172, 713/155; 726/9, 20
See application file for complete search history.

(56) References Cited

U.S. PATENT DOCUMENTS

| | | | |
|---|---|---|---|
| 5,710,884 A | * | 1/1998 | Dedrick ............... 709/217 |
| 6,857,067 B2 | * | 2/2005 | Edelman ............... 713/155 |
| 6,981,152 B2 | * | 12/2005 | Du et al. ............... 713/193 |
| 7,054,845 B2 | * | 5/2006 | Oshima et al. .......... 705/78 |
| 2001/0042212 A1 | * | 11/2001 | Du et al. ............... 713/200 |
| 2003/0014625 A1 | * | 1/2003 | Freed et al. ............ 713/153 |

FOREIGN PATENT DOCUMENTS

| | | |
|---|---|---|
| JP | 11-219412 | 8/1999 |
| JP | 2000-48141 | 2/2000 |
| JP | 2001-282543 | 10/2001 |
| JP | 2001-325037 | 11/2001 |
| JP | 2001-338271 | 12/2001 |
| JP | 2002-073571 | 3/2002 |

* cited by examiner

*Primary Examiner*—Kim Vu
*Assistant Examiner*—April Y. Shan
(74) *Attorney, Agent, or Firm*—Jacobson Holman PLLC

(57) ABSTRACT

The present invention provides a data updating method and a data updating system, which can update data of an IC card through a network without mistaking the IC card targeted for updating. When each of issuer client authentication, personal authentication, issuer server authentication and device authentication is performed, a server transmits update data encrypted by a public key used for the device authentication to a client. Then, the client outputs the encrypted update data to an IC card. In the IC card, the update data is decrypted by a secret key used for the device authentication. Based on the decrypted update data, rewriting is carried out in the IC card.

14 Claims, 4 Drawing Sheets

DATA UPDATING METHOD AND DATA UPDATING SYSTEM

BACKGROUND OF THE INVENTION

1. Field of the Invention

The present invention relates to a data updating method for updating data stored in an IC card or the like including new registration and additional registration through a network. More particularly, the invention relates to a data updating method and a data updating system which can perform updating by unmistakably specifying a device, and surely and safely without any human assistance.

2. Description of the Related Art

Conventionally, when important data stored in an IC card (smart card) or other devices equipped with removable personal authentication functions, e.g., a network password, an electronic certificate, or information for single sign-on, is added, or when important information such as dial-up information, information in the IC card/smart card or a fingerprint collation token, or an expiration date is updated, either a method for first collecting the IC card to rewrite data and then returning it to a user, or a method for invalidating the card and issuing a new card where update data has been written to the user has been employed.

Though it is not a technology for updating important data used for personal authentication, in a conventional art regarding personal authentication, there is Japanese Patent Application Laid-Open No. 2002-73571 "PERSONAL AUTHENTICATION SYSTEM, PERSONAL AUTHENTICATION METHOD, AND PROGRAM PROVIDING MEDIUM" (applicant: Sony Inc, inventors: Hideaki WATANABE et al.) laid open in Mar. 12, 2002.

This invention manages a personal identification certificate in a personal authentication system, which uses the personal identification certificate storing a template as personal identification data.

However, in the conventional data updating method inside the device equipped with the removable personal authentication function, collection/reissuance or new issuance takes time and labor, and the important data cannot be updated through the network without its leakage to the outside, consequently creating a problem of lack of convenience.

SUMMARY OF THE INVENTION

Objects of the present invention are to provide a data updating method and a data updating system, which can unmistakably specify a device and update data of a-recording medium through a network including new registration and additional registration automatically or by starting processing.

The present invention provides a data updating method including new registration and additional registration, which comprises the steps of: causing a server to perform device authentication for a device which stores a secret key used for the device authentication, and to transmit update data encrypted by using a public key corresponding to the secret key to a client to which the device is connected; causing the client to input the update data to the device; and causing the device to decrypt the update data by the secret key, and to update data therein based on the decrypted update data. Thus, without mistaking the device which is a target for update data rewriting, only the device having the secret key used for the device authentication can decrypt the update data and update the data. Secrecy of the update data can be held, and data updating can be realized in the device through a network.

The present invention provides a data updating method including new registration and additional registration, which comprises the steps of: causing a server to perform device authentication for a device which stores a secret key used for the device authentication, and to transmit update data encrypted by using a public key corresponding to the secret key to a client to which the device is connected; causing the client to input the update data to the device; and causing the device to store the update data, and to decrypt the update data by the secret key each time the update data is used, whereby the decrypted update data is used. Thus, without mistaking the device which stores the update data, only the device having the secret key used for the device authentication can decrypt and use the update data. Secrecy of the update data can be held, and data supplying can be realized in the device through a network.

The present invention provides a data updating system which comprises: a device to store a secret key used for device authentication; a server to transmit, when device authentication is performed, update data encrypted by a public key corresponding to the secret key to the device where the device authentication has been carried out; and a client to receive the encrypted update data which has been transmitted, and to output the update data to the device, wherein the device decrypts the encrypted update data inputted from the client by the secret key, and performs data updating in the device based on the decrypted update data. Thus, without mistaking the device which is a target for update data rewriting, only the device having the secret key used for the device authentication can decrypt the update data and update the data. Secrecy of the update data can be held, and data updating can be realized in the device through a network.

The present invention provides a data updating system which comprises: a device to store a secret key used for device authentication; a server to transmit, when device authentication is performed, update data encrypted by a public key corresponding to the secret key to the device where the device authentication has been carried out; and a client to receive the encrypted update data which has been transmitted, and to output the update data to the device, wherein the device stores the encrypted update data inputted from the client, and decrypts the update data by the secret key each time the update data is used, whereby the decrypted update data is used. Thus, without mistaking the device which stores the update data, only the device having the secret key used for the device authentication can decrypt and use the update data. Secrecy of the update data can be held, and data supplying can be realized in the device through a network.

According to the present invention, in the data updating method or the data updating system, since issuer client authentication, personal authentication, and issuer server authentication are performed, security can be improved.

<Description of Reference Numerals>

1 . . . server, 2 . . . DB, 3 . . . Internet, 4 . . . client, 5 . . . IC card reader/writer, 6 . . . IC card, 7 . . . issuer server, 8 . . . IC card reader/writer

DESCRIPTION OF THE PREFERRED EMBODIMENT

The preferred embodiment of the present invention will be described with reference to the accompanying drawings.

According to a data updating system of the embodiment of the present invention, when each of personal authentication, issuer authentication and device authentication is performed, and a server transmits update data encrypted by a public key corresponding to a device authenticator to a client, at an IC card, the encrypted update data is decrypted by a secret key corresponding to the device authenticator therein, and rewriting is performed in the IC card based on the decrypted update data.

Thus, without collecting the IC card, updating (including new registration or additional registration) of important data in the IC card can be performed through a network automatically or by starting processing while holding secrecy of the important data.

Figure 1:
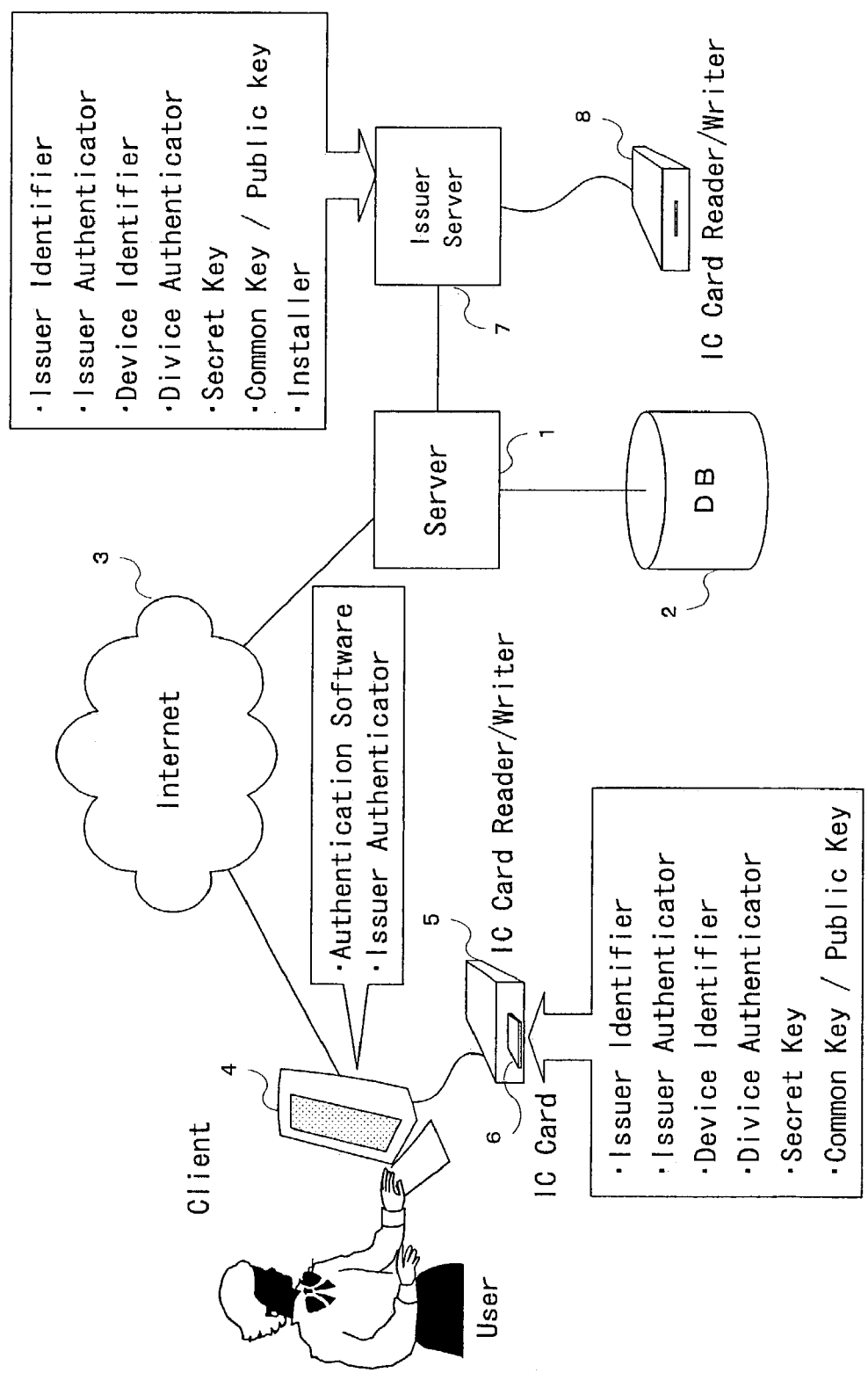
FIG. 1 is a schematic configuration view of a data updating system according to an embodiment of the present invention.

The data updating system (the present system) of the embodiment of the present invention will be described by referring to FIG. 1. FIG. 1 is a schematic configuration view of the data updating system of the embodiment of the present invention.

As shown in FIG. 1, the present system basically comprises a server 1, a database (DB) 2, Internet 3, a client 4, an IC card reader/writer 5, an IC card 6, an issuer server 7, and an IC card reader/writer 8.

In FIG. 1, to simplify explanation, only one of each of the client 4, the IC card reader/writer 5, and the IC card 6 is shown. However, there are pluralities of clients 4 and others which are connected to the Internet 3.

Additionally, the client 4 and the server 1 are interconnected through the Internet 3, and the issuer server 7 is connected to the server 1.

Next, each section of the present system will be described specifically.

For the present processing (updating processing) from the client 4 through the Internet 3, the server 1 performs personal authentication processing, issuer authentication processing and device authentication processing, and transmits data (encrypted data) regarding the client which is stored in the DB 2 to the client 4 through the Internet 3 after completion of all the authentications.

Here, the personal authentication processing is single or composite authentication using biological data such as fingerprint data, voice data, image data of a face, or image data of a pore color, a retina, a signature or a palm shape and/or a personal identification number (PIN). The authentication is performed between the IC card 6 and the client 4, or in the IC card 6.

The issuer authentication processing has issuer client authentication which compares and collates an issuer authenticator in the IC card 6 with an issuer authenticator in a memory of the client 4 to perform authentication by operating authentication software (software installed by an installer) held by the client 4, and issuer server authentication which, by operating the authentication software, transmits the issuer authenticator in the IC card 6 to the server 1, decrypts the received issuer authenticator at the server 1 to obtain an issuer identifier, and compares and collates the issuer identifier with an issuer identifier stored in the DB 2 to perform authentication.

The issuer server authentication will be described in detail. The issuer identifier provided from an issuer of the IC card 6 and the issuer authenticator encrypted by a common key or a public key (common key/public key) is stored in the IC card 6. The encrypted issuer authenticator is transmitted from the IC card 6 through the client 4 to the server 1. The issuer authenticator encrypted at the server 1 is decrypted by a common key or a secret key (common key/secret key) to take out the issuer identifier. Comparison is made with the issuer identifier stored in the DB 2 to determine whether the decrypted issuer identifier is proper or not.

Here, an encryption key system used for encrypting or decrypting in the issuer authentication is a common key system or a public key system. Especially, in the case of the public key system, it is the IC card 6 side that has a public key, and it is the server 1 that has a corresponding secret key.

Additionally, the server 1 is previously provided with an issuer identifier and an issuer authenticator issued from the connected issuer server 7 to the IC card 6, and the issuer identifier and the issuer authenticator are stored in the DB 2.

Further, the device authentication processing is device authentication using a challenge response (on-line authentication). Specifically, a random number is generated at the server 1, and the random number is transmitted to the client 4. The client 4 outputs the random number received from the server 1 to the IC card 6. At the IC card 6, the random number is encrypted by its secret key, and the encrypted random number and the device identifier are outputted to the client 4. The client 4 transmits the encrypted random number and the device identifier to the server 1. Then, the server 1 obtains a corresponding public key from the device identifier, decrypts the encrypted random number by the public key, and compares and collates the decrypted random number with the generated random number. If they coincide with each other, the device authentication has been successful.

The server 1 may transmit the common key for encrypting the device identifier in the IC card 6 together with the random number. In this case, at the IC card 6, the device identifier is encrypted by using the received common key, and the encrypted random number and the encrypted device identifier are transmitted to the server 1. Then, the server 1 decrypts the received encrypted device identifier by the common key held inside, obtains a public key corresponding to the decrypted device identifier, and random number decrypted by the public key is decrypted to perform random number comparison and collation.

A communication packet between the server 1 and the client 4 may be encrypted by using a technology such as a secure socket layer (SSL) or a virtual private network (VPN). Encryption by SSL or the like is effective between the server 1 and the client 4. However, between the client 4 and the IC card 6, the present processing is effective for secret protection.

In the case of the device authentication using no challenge responses, the device identifier stored in the IC card 6 is encrypted by a stored secret key to generate a device authenticator, which is outputted to the client 4. The client 4 transmits the encrypted device authenticator to the server 1. The server 1 decrypts the encrypted device authenticator by a corresponding public key to obtain a device identifier, and this device identifier is compared and collated with the device identifier stored in the DB 2. If they coincide with each other, the device authentication has been successful.

The server 1 encrypts update data for updating important data in the IC card 6, and stores the encrypted update data in the DB 2. According to this encryption method, encryption is carried out by using a public key corresponding to the device identifier.

Then, the sever 1 transmits the encrypted update data stored in the DB 2 to the client 4 through the Internet 3 to update the important data in the IC card 6.

The database (DB) 2 stores the issuer identifier, the issuer authenticator and the common key/secret key for performing the issuer authentication, the device identifier, the device authenticator and the public key for performing the device authentication, and the encrypted update data for updating the important data of the IC card 6. Here, the encrypted issuer identifier is the issuer authenticator, and the encrypted random number or device identifier is the device authenticator.

In the authentication processing at the server 1, the decrypted issuer identifier and the decrypted device identifier are obtained. Accordingly, in the DB 2, it is enough to store at least the issuer identifier, the common key/secret key for the issuer authentication, the device identifier and the public key for the device authentication, and the update data.

The Internet 3 is a communication medium between the server 1 and the client 4. In place of the Internet 3, a communication medium such as a wide area network (WAN) or a local area network (LAN) may be used.

The client 4 is a computer connected to the present system. Updating processing is permitted in the present system by authentication such as personal authentication, issuer authentication or device authentication, and information from the server 1 is written in the IC card 6.

The client 4 holds authentication software installed by an installer which the issuer server 7 issues on-line through a network or off-line through a recording medium such as a CD-ROM. Issuer authentication (issuer client authentication) is performed at the client, and the issuer authenticator in the IC card 6 is transmitted to the server 1 to perform issuer authentication (issuer server authentication).

Specifically, the client 4 operates the authentication software, reads the issuer authenticator from the IC card 6 by the IC card reader/writer 5 to perform issuer client authentication, and compares and collates it with the issuer authenticator stored in the memory. If they coincide with each other, considering that the issuer client authentication has been successful, issuer server authentication is performed next.

To perform the issuer server authentication, the client 4 reads the issuer authenticator from the IC card 6 by the IC card reader/writer 5, and transmits it to the server 1 through the Internet 3.

For device authentication, the client 4 outputs the random number received from the sever 1 to the IC card 6. The device authenticator generated by encrypting the secret key corresponding to the device identifier at the IC card 6, and additionally the device identifier are read from the IC card 6 by the IC card reader/writer 5. The device authenticator and the device identifier are transmitted to the server 1 through the Internet 3.

Then, after completion of each authentication, as data updating processing, the client 4 receives the encrypted update data from the server 1, and outputs the data to the IC card 6.

The client 4 may be a personal computer (PC) a personal information terminal (PDS), a portable telephone, a PHS, or a home information appliance which can be connected to the network.

The personal authentication is performed by using biological data and PIN data singly or compositely. The authentication is carried out in the IC card 6 or between the IC card 6 and the client 4.

The encrypted issuer authenticator and the encrypted device authenticator are also read from the IC card 6, and transmitted from the client 4 to the server 1.

Here, if the user is not identified in the personal authentication, subsequent issuer authentication and device authentication are not performed.

The IC card reader/writer 5 reads information from the IC card 6, and outputs it to the client 4. Also, the IC card reader/writer 5 writes information in the IC card 6 by instruction from the client 4.

The IC card 6 comprises a central processing unit (CPU), and can perform processing independently. The IC card 6 stores the biological data and the PIN data for performing the personal authentication, the issuer identifier, the issuer authenticator and the common key/public key for performing the issuer authentication, and the device identifier and the secret key for performing the device authentication. Here, each data has tamper resistance which disappears when the IC card 6 is forcedly opened.

At the IC card 6, the personal authentication is performed based on the biological data and the PIN data held inside. In the issuer client authentication, the issuer authenticator is outputted to the client 4. In the issuer server authentication, the issuer authenticator is outputted to the client 4.

In the case of the device authentication based on the challenge response, at the IC card 6, the random number transmitted from the server 1 is inputted from the client 4, the random number is encrypted by the secret key to generate a device authenticator, and the generated device authenticator and the device identifier are outputted to the client 4. The device authenticator and the device identifier are transmitted from the client 4 to the server 1.

From the server 1, the common key for encrypting the device identifier in the IC card 6 may be transmitted together with the random number. In this case, at the IC card 6, the device identifier is encrypted by using the received common key, and the encrypted random number and the encrypted device identifier are transmitted to the server 1. Then, the server 1 decrypts the received encrypted device identifier by the common key held inside to obtain a public key corresponding to the decrypted device identifier, and the encrypted random number is decrypted by the public key to perform random number comparison and collation. Thus, it is possible to prevent flowing of the unencrypted device identifier through the network.

A communication packet between the server 1 and the client 4 may be encrypted by using a technology such as SSL or VPN.

In the case of the device authentication not based on the challenge response, at the IC card 6, the device identifier is encrypted by the secret key to generate a device authenticator, and the device authenticator is outputted to the client 4.

The present system has been described by way of example of the IC card. However, the system may use a device equipped with a token, an independent fingerprint authentication unit (intelligent authentication unit: IAU), or a device which has removable personal authentication function.

The issuer server 7 comprises the IC card reader/writer 8. Therefore, the issuer server 7 writes the issuer identifier, the issuer authenticator and the common key/public key for the issuer authentication decided at the issuer of the IC card 6, and the device identifier, the device authenticator and the secret key for the device authentication corresponding to each IC card 6 off-line in the IC card 6. Furthermore, the issuer server 7 transmits the issuer identifier, the issuer authenticator, the common key/public key, the device identifier, the device authenticator and the public key of the IC card 6 to the sever 1 on-line, and stores the issuer authenticator, the device authenticator etc. in the DB 2.

Here, the issuer identifier and the issuer authenticator are information unique to the issuer, and the device identifier and the device authenticator are information unique to the device.

Additionally, the issuer server 7 registers the issuer authenticator for the issuer client authentication in the client 4 by the operation of the authentication software of the client 4.

The common key/public key written in the IC card 6 for the issuer authentication and the common key/secret key written in the DB 2 correspond to each other. The secret key written in the IC card 6 for the device authentication and the public key written in the DB 2 correspond to each other. Data encrypted by one key can be decrypted by the other key.

Incidentally, the public key written in the DB 2 for the device authentication is used for encrypting the update data updated at the IC card 6. The secret key written in the IC card 6 for the device authentication is used for decrypting the encrypted update data transmitted from the server 1.

In the case of performing the device authentication based on the challenge response, information written for the device authentication in the IC card 6 is the device identifier and the secret key.

In the case of performing device authentication not based on any challenge responses, information written for the device authentication in the IC card 6 is the device identifier, the device authenticator and the secret key. Here, if the device identifier is encrypted by the secret key to generate a device authenticator, and the device authenticator is transmitted to the server 1 for each device authentication, the device identifier and the secret key only need to be written in the IC card 6.

Figure 2:
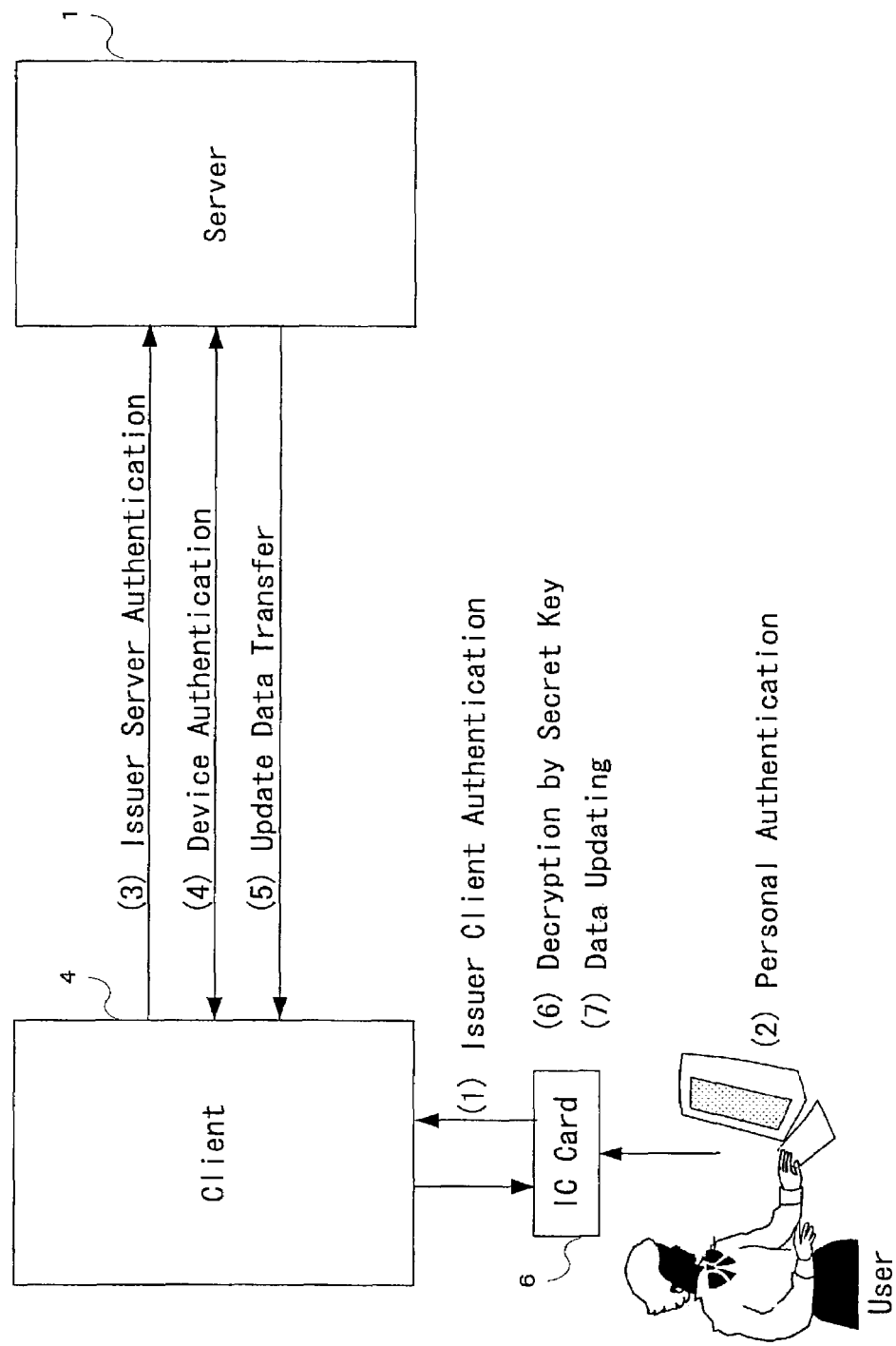
FIG. 2 is a processing schematic view showing an outline of processing in the data updating system for performing updating processing including new registration and additional registration according to the embodiment of the present invention.
Figure 3:
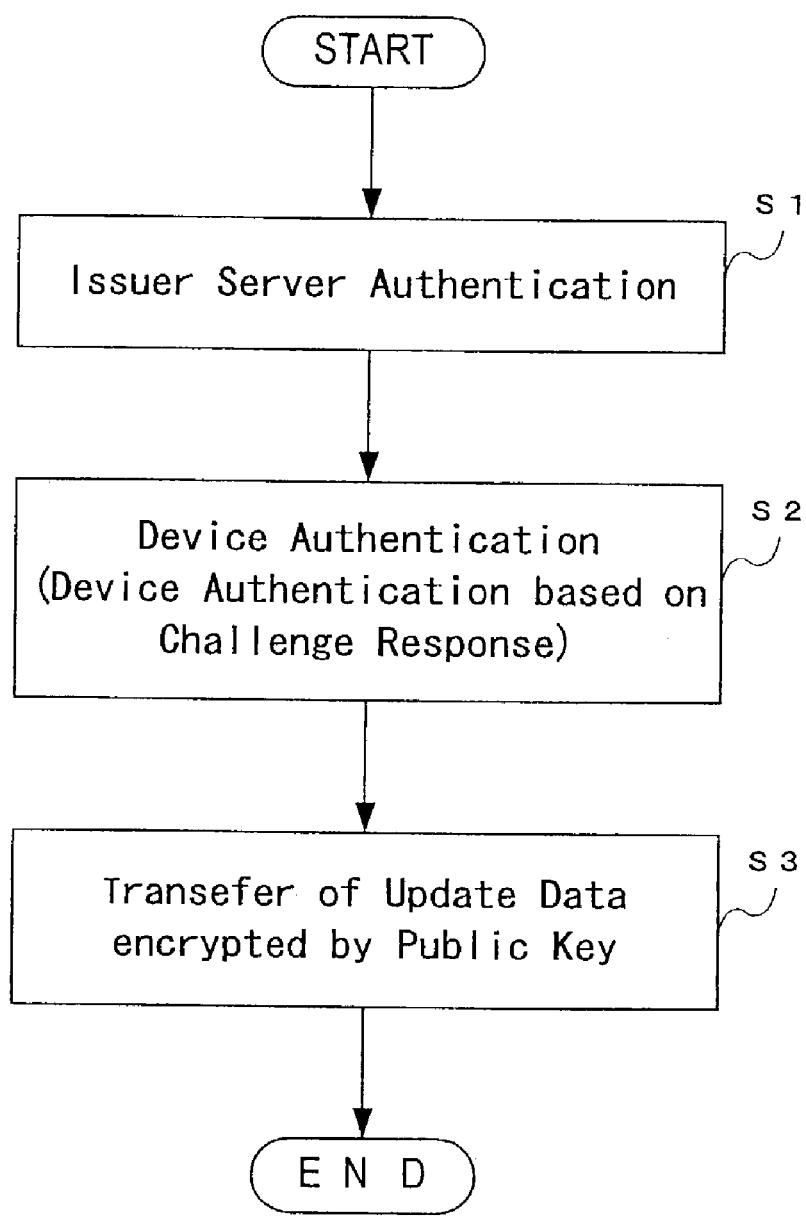
FIG. 3 is a flowchart showing a flow of processing in a server 1.
Figure 4:
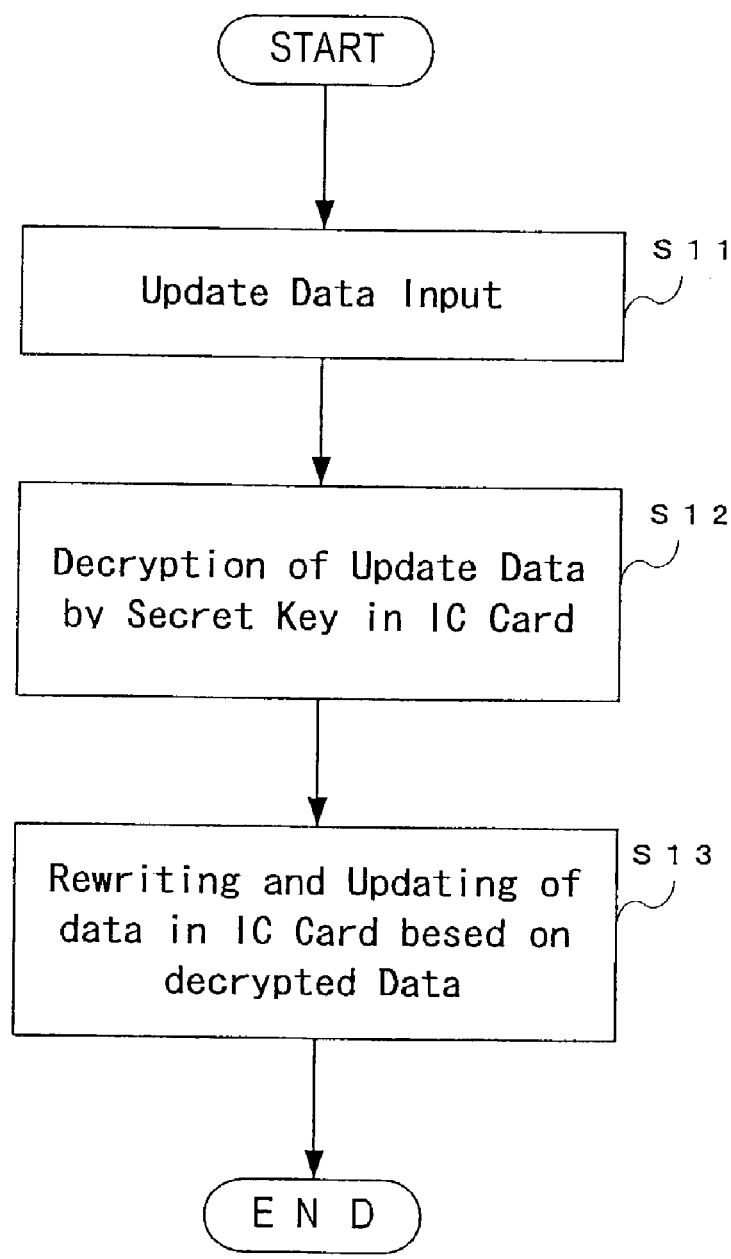
FIG. 4 is a flowchart showing a flow of processing in an IC card 6.

Next, an operation of the present system will be described by reference to FIGS. 2 to 4. FIG. 2 is a processing schematic view showing an outline of processing in the data updating system for performing updating processing including new registration or additional registration according to the embodiment of the present invention, FIG. 3 is a flowchart showing a flow of processing in the server 1, and FIG. 4 is a flowchart showing a flow of processing in the IC card 6.

As shown in FIG. 2, the client 4 reads the issuer authenticator from the IC card 6 by operating the authenticator software, and compares and collates the read issuer authenticator with the issuer authenticator therein to perform issuer client authentication (1). If a result of the comparison and collation shows coincidence, considering that the issuer client authentication has been successful, then, the user performs personal authentication (2) in the IC card 6 by using biological data, PIN data or the like.

If the personal authentication is proper, then, at the IC card 6, the issuer authenticator is transmitted from the client 4 to the server 1 to perform issuer server authentication (3) at the server 1 (S1).

In the issuer server authentication, the sever 1 receives the issuer authenticator outputted from the IC card 6, performs decryption by the common key/secret key for decryption stored in the DB 2 to obtain a decrypted issuer identifier, and compares and collates this issuer identifier with the issuer identifier stored in the DB 2. If a result of the comparison and collation shows coincidence, then, considering that the issuer server authentication has been successful, device authentication (4) is performed.

In the device authentication (4) based on a challenge response (S2), the sever 1 generates a random number, and transmits the random number through the client 4 to the IC card 6. At the IC card 6, the random number is encrypted by the secret key for the device authentication, and the device identifier (or device identifier encrypted by the common key, which has been transmitted from the sever 1) and the encrypted random number are transmitted through the client 4 to the server 1. The server 1 decrypts the encrypted random number by the public key corresponding to the device identifier (in the case of the encrypted device identifier, the device identifier decrypted by the common key held by the server 1), and compares and collates the decrypted random number with the initially generated random number to perform device authentication. If a result of the comparison and collation shows coincidence of both, the device authentication has been successful.

In the case of the device authentication not based on any challenge responses, at the IC card 6, the device identifier is encrypted by the secret key for the device authentication to generate a device authenticator, and the device authenticator is transmitted through the client 4 to the server 1. The server 1 receives the device authenticator, decrypts the device authenticator by the public key corresponding to the device authenticator to obtain a device identifier, and compares and collates the device identifier stored in the DB 2 with the device identifier to perform device authentication. If a result of the comparison and the collation shows coincidence of both, the device authentication has been successful.

After the proper end of the device authentication, the server 1 reads the update data encrypted by the public key for the device authentication from the DB 2, and transfers it to the client 4 through the Internet 3. The client 4 outputs the encrypted update data to the IC card 6 (5) (S3).

Further, at the IC card 6, the encrypted update data is inputted (S11), and the update data is decrypted by the secret key for the device authentication in the IC card 6 (S12) (6). Then, based on the decrypted data, the important data in the IC card 6 is rewritten to be updated (S13) (7).

Incidentally, at the IC card 6, the inputted encrypted update data may be stored in its state, and decrypted by the secret key to be used when a need arises to refer to the update data.

According to the present system, the personal authentication, the issuer authentication and the device authentication are performed. The server 1 reads the update data encrypted by the public key for the device authentication from the DB 2, and transmits it to the client 4. The client 4 outputs the received encrypted update data to the IC card 6. At the IC card 6, the update data is decrypted by the secret key for the device authentication to rewrite the data in the IC card 6. Thus, the system is advantageous in that the device authentication is performed to prevent mistaking of the IC card which is a target for update data rewriting, even if the update data is wiretapped, only the IC card 6 having the secret key for the device authentication can decrypt the data to enable improvement of security, and the server 1 can update the important data in the target IC card 6 through the network.

The present system has been described by way of example of data updating processing in the IC card 6. However, when the user logs in the network of the system, personal authentication, issuer authentication and device authentication are performed to enable automatic writing of data following a system change in the IC card 6 while the user needs to carry out no conscious processing.

Accordingly, the system is advantageous in that updating of an application expiration date, an update expiation date and an expiration date of an electronic certificate, periodic changing of a network password for each user, etc. can be easily carried out.

Specifically, in the case of periodically changing the network password, a changed password is encrypted by a public key to be set in the DB 2 on a changing day, and each authentication is performed by user's logging-in. If proper, the server 1 transmits the encrypted password from the DB 2 to the client 4. The client 4 outputs the encrypted password to the IC card 6. At the IC card 6, the inputted encrypted password is decrypted by a secret key. The decrypted password is stored in the IC card 6. Accordingly, the network password in the IC card 6 has been changed.

According to the present invention, the data updating method including new registration and additional registration comprises the steps of: causing the server to perform device authentication for the device which stores the secret key used for the device authentication, and to transmit the update data encrypted by using the public key corresponding to the secret key to the client to which the device is connected; causing the client to input the update data to the device; and causing the device to decrypt the update data by the secret key, and to update data therein based on the decrypted update data. Thus, the invention is advantageous in that without mistaking the device which is a target for update data rewriting, only the device having the secret key used for the device authentication can decrypt the update data and update the data, secrecy of the update data can be held, and data updating can be realized in the device through the network.

According to the present invention, the data updating method including new registration and additional registration comprises the steps of: causing the server to perform device authentication for the device which stores the secret key used for the device authentication, and to transmit the update data encrypted by using the public key corresponding to the secret key to the client to which the device is connected; causing the client to input the update data to the device; and causing the device to store the update data, to decrypt the update data by the secret key each time the update data is used, and to use the decrypted update data. Thus, the invention is advantageous in that without mistaking the device which stores the update data, only the device having the secret key used for the device authentication can decrypt and use the update data, secrecy of the update data can be held, and data supplying can be realized in the device through the network.

According to the present invention, the data updating system comprises: the device to store the secret key used for device authentication; the server to transmit, when device authentication is performed, the update data encrypted by the public key corresponding to the secret key to the device where the device authentication has been carried out; and the client to receive the encrypted update data which has been transmitted, and to output the update data to the device, wherein the device decrypts the encrypted update data inputted from the client by the secret key, and performs data updating in the device based on the decrypted update data. Thus, the invention is advantageous in that without mistaking the device which is a target for update data rewriting, only the device having the secret key used for the device authentication can decrypt the update data and update the data, secrecy of the update data can be held, and data updating can be realized in the device through the network.

According to the present invention, the data updating system comprises: the device to store the secret key used for device authentication; the server to transmit, when device authentication is performed, the update data encrypted by the public key corresponding to the secret key to the device where the device authentication has been carried out; and the client to receive the encrypted update data which has been transmitted, and to output the update data to the device, wherein the device stores the encrypted update data inputted from the client, decrypts the update data by the secret key each time the update data is used, and uses the decrypted update data. Thus, the invention is advantageous in that without mistaking the device which stores the update data, only the device having the secret key used for the device authentication can decrypt and use the update data, secrecy of the update data can be held, and data supplying can be realized in the device through the network.

According to the present invention, in the data updating method or the data updating system, since issuer client authentication, personal authentication, and issuer server authentication are performed, security can be improved.

What is claimed is:

1. A data updating method comprising steps of:

storing a first secret key used for device authentication and a first common key or public key used for issuer authentication in a device;

outputting an issuer authenticator encrypted by the first common key or public key from the device to a client computer;

outputting a device authenticator encrypted by using the first secret key from the device to the client computer, decrypting the encrypted update data inputted from the client computer by the first secret key and updating data therein based on the decrypted update data;

transmitting the encrypted issuer authenticator in the client computer to a server, transmitting the encrypted device authenticator inputted from the device to the server, receiving the encrypted update data transmitted from the server and outputting the encrypted update data to the device;

storing a second common key or a second secret key used for the issuer authentication in the server, decrypting the encrypted issuer authenticator received from the client computer by the stored second common or secret key, obtaining an issuer identifier, comparing and collating the obtained issuer identifier with a stored issuer identifier, performing issuer server authentication, decrypting the encrypted device authenticator received from the client computer by a second public key corresponding to the device authenticator, obtaining a device identifier, comparing and collating the obtained device identifier with a stored device identifier, performing the device authentication, and transmitting the update data encrypted by using the second public key corresponding to the first secret key to the client computer, wherein said issuer authenticator and issuer identifier are unique to identify an issuer of the device, and said device authenticator and device identifier are unique to identify the device.

2. The data updating method according to claim 1, further comprising steps of:

causing the device, when the data updating is realized therein based on the encrypted update data inputted from the client computer, to decrypt the encrypted update data by using the first secret key; to perform data updating therein based on the decrypted update data; when update data is supplied to use, to store the encrypted update data; to decrypt the encrypted update data by the first secret key each time the update data is used; and to supply the decrypted update data to use.

3. The data updating method according to claim 1, wherein the client computer obtains an issuer authenticator from an issuer and, issuer client authentication is performed before the issuer server authentication by comparing and collating the issuer authenticator read from the device with the issuer authenticator obtained from the issuer.

4. The data updating method according to claim 3, wherein the device comprises a personal authentication function, and data updating is performed by carrying out the issuer client authentication, the personal authentication, the issuer server authentication and the device authentication.

5. A data updating system comprising:

a computer device including a central processing unit to store a first secret key used for device authentication, and a first common key or public key used for issuer authentication;

a client computer including a central processing unit connected to the device;

a computer server including a central processing unit connected the client computer by a network;

wherein the device outputs an issuer authenticator encrypted by the first common key or public key to the client computer, outputs a device authenticator encrypted by using the first secret key to the client computer, decrypts the encrypted update data inputted from the client computer by the first secret key, and updates data therein based on the decrypted update data;

the client computer transmits the encrypted issuer authenticator to the server, transmits the encrypted device authenticator inputted from the device to the server, receives the encrypted update date transmitted from the server, and outputs the encrypted update data to the device;

the server stores a second common key or a second secret key used for the issuer authentication, decrypts the encrypted issuer authenticator received from the client computer by the stored second common or secret key to obtain an issuer identifier, and compares and collates the obtained issuer identifier with a stored issuer identifier to perform issuer server authentication, decrypts the encrypted device authenticator received from the client computer by a second public key corresponding to the device authenticator, obtains a device identifier, compares and collates the obtained device identifier with a stored device identifier to perform the device authentication, and transmits the update data encrypted by using the second public key corresponding to the first secret key to the client computer, wherein said issuer authenticator and issuer identifier are unique to identify an issuer of the device, and said device authenticator and device identifier are unique to identify the device.

6. The data updating system according to claim 5, wherein the device, when the data updating is realized therein based on the encrypted update data inputted from the client computer, decrypts the encrypted update data by using the first secret key; performs data updating therein based on the decrypted update data; when update data is supplied to use, stores the encrypted update data inputted from the client computer; decrypts the encrypted update data by the first secret key each time the update data is used; and supplies the decrypted update data to use.

7. The data updating system according to claim 5, wherein the server generates a random number, transmits the random number to the client computer, decrypts an encrypted random number received from the client computer by the second public key corresponding to a device identifier received from the client computer, and compares and collates the decrypted random number with the generated random number to perform the device authentication, the client computer outputs the random number received from the server to the device, and transmits the encrypted random number inputted from the device and the device identifier to the server, and the device encrypts the random number inputted from the client computer by the stored first secret key, and outputs the stored device identifier and the encrypted random number to the client computer.

8. The data updating system according to claim 7, wherein the server transmits the random number and the second common key to encrypt the device identifier to the client computer, decrypts an encrypted device identifier received from the client computer by the second common key, decrypts the random number encrypted by the second public key corresponding to the decrypted device identifier, and compares and collates the decrypted random number with the generated random number to perform the device authentication, the client computer outputs the random number and the second common key received from the server to the device, and transmits the encrypted random number inputted from the device and the encrypted device identifier to the server, and the device encrypts the random number inputted from the client computer by the first stored secret key, encrypts the stored device identifier by the second common key, and outputs the encrypted random number and the encrypted device identifier to the client computer.

9. The data updating system according to claim 5, wherein a communication packet between the server and the client computer is encrypted.

10. The data updating system according to claim 7, wherein a communication packet between the server and the client computer is encrypted.

11. The data updating system according to claim 5, wherein the client computer obtains an issuer authenticator from an issuer and, issuer client authentication is performed before the issuer server authentication by comparing and collating the issuer authenticator read from the device with the obtained issuer authenticator.

12. The data updating system according to claim 7, wherein the client computer obtains an issuer authenticator from an issuer and, issuer client authentication is performed before the issuer server authentication by comparing and collating the issuer authenticator read from the device with the obtained issuer authenticator.

13. The data updating system according to claim 11, wherein the device comprises a personal authentication function, the client computer performs the issuer client authentication, the device performs personal authentication, the server performs the issuer server authentication and the device authentication, and the device performs the data updating.

14. The data updating system according to claim 12, wherein the device comprises a personal authentication function, the client computer performs the issuer client authentication, the device performs personal authentication, the server performs the issuer server authentication and the device authentication, and the device performs the data updating.

* * * * *